(No Model.)
E. SOLVAY.
Apparatus for the Decomposition of Chloride of Calcium.
No. 235,820. Patented Dec. 21, 1880.
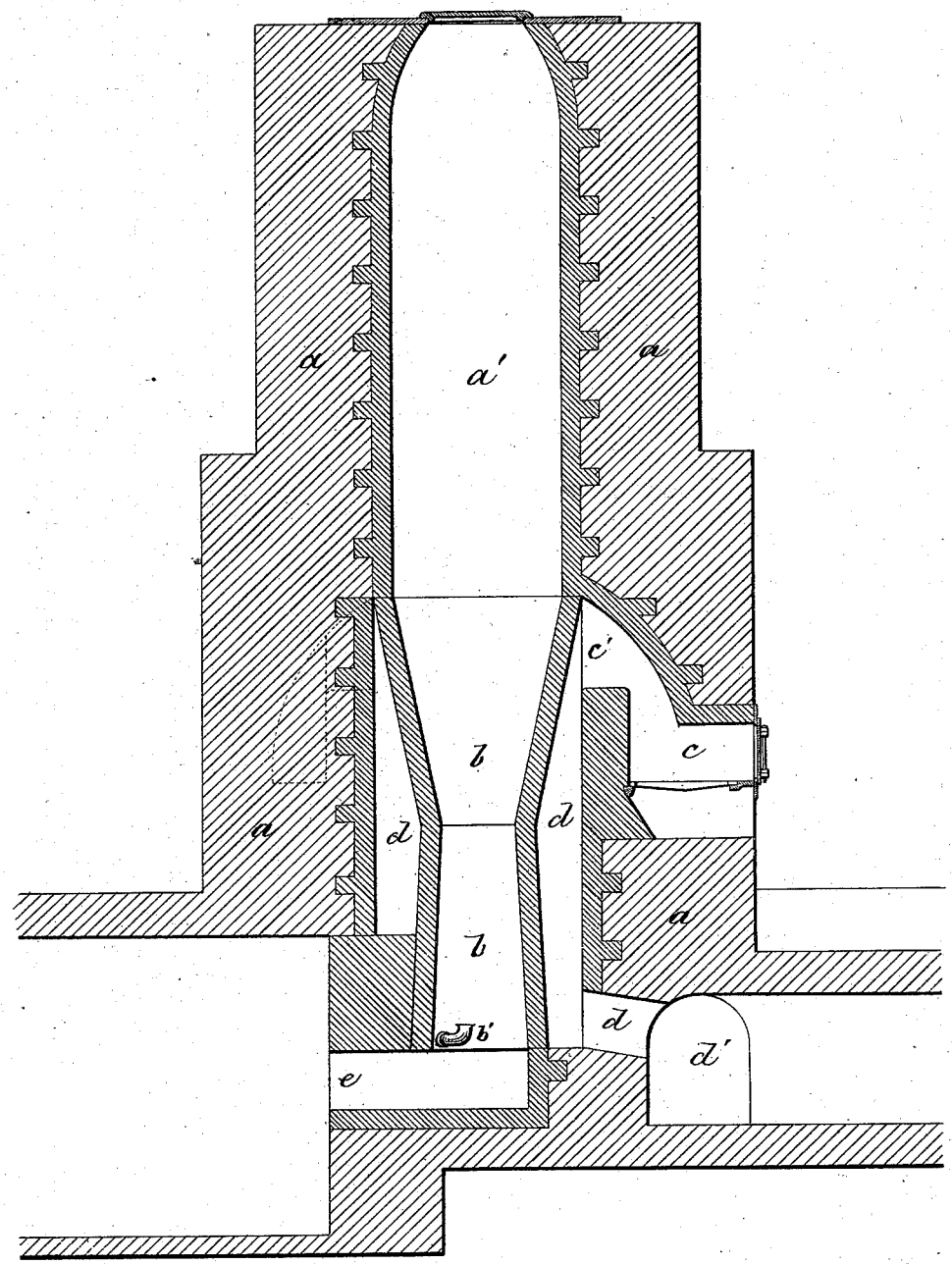
Attest:
James M. Knight
J. A. Rutherford
Inventor:
Ernst Solvay.
By James L. Norris,
Atty

UNITED STATES PATENT OFFICE.

ERNEST SOLVAY, OF BRUSSELS, BELGIUM.

APPARATUS FOR THE DECOMPOSITION OF CHLORIDE OF CALCIUM.

SPECIFICATION forming part of Letters Patent No. 235,820, dated December 21, 1880.

Application filed September 4, 1880. (No model.) Patented in England February 25, 1880.

*To all whom it may concern:*

Be it known that I, ERNEST SOLVAY, of Brussels, in the Kingdom of Belgium, manufacturer, have invented new and useful Improvements in Means and Apparatus for the Decomposition of Chloride of Calcium, in order to obtain therefrom hydrochloric acid and chlorine, (for which I have obtained a patent in England, No. 838, bearing date February 25, 1880,) of which the following is a specification.

When it is required to obtain hydrochloric acid from a mixture of chloride of calcium and clay, or other silicious or aluminous substance which is introduced into an upright cylinder or cupola, it may be done either by heating the said cylinder exteriorly and blowing into it at the bottom vapor of water more or less mixed with air, or by conveying into the said cylinder the products of combustion from a furnace, or several furnaces, accompanied by a suitable quantity of vapor of water, or by adding in the said cylinder the fuel itself to the mixture which is to be decomposed, and introducing at the bottom the necessary air and steam, or else by simply heating only the steam and air previously to their entrance into the cylinder.

In the application of the means last described I provide at the bottom of the cylinder or cupola an annex or retort, made of fire-clay or cast-iron, which really is a continuation of the inside of the said cylinder or cupola, and serves as a passage for the decomposed mixture which issues from it. I also place round this retort a furnace, or several furnaces, so as to keep up a suitable temperature, and I blow in at the bottom of the said retort the mixture of air and steam which is to effect the decomposition and the liberation of the hydrochloric acid in the cylinder or cupola. By these means the air and steam blown into the cupola can profit by the heat of the material issuing from it, and are also heated by the furnaces outside it, and this is effected at the precise moment when and nearly at the exact spot where they should be applied. The retort should not be of too great diameter, in order that the heat outside it may penetrate sufficiently into it.

In the foregoing description I have only referred to the liberation of hydrochloric acid; but it is obvious that this same arrangement of parts will be equally effective in causing chlorine to evolve directly from the chloride of calcium, the only difference being that, instead of causing vapor of water more or less mixed with air to pass into the retort, only air is introduced into it.

Having now explained the nature of my said invention, I will proceed to describe, with reference to the accompanying drawing, apparatus carrying the same into effect.

The said drawing represents a sectional elevation of a tower or cupola for obtaining hydrochloric acid or chlorine from a mixture of chloride of calcium and clay or other silicious or aluminous substance constructed according to my invention.

$a$ represents the tower or cupola, and $a'$ the inner cylindrical chamber in which the decomposition of the mixture is effected. The said chamber $a'$ is provided at the bottom with an annex or retort, $b$, made of fire-clay, which forms a continuation of the inside $a'$ of the said tower $a$, and serves as a passage for the decomposed mixture issuing from the said tower.

$c$ is a furnace extending round the said retort, the products of combustion passing through the flues $c'$ to the outside of the said retort $b$, upon which they impinge in their passage to the chimney through the flues $d\ d'$.

$e$ is a passage through which the decomposed mixture passes out from the retort $b$. Air and steam (or air alone when chlorine is to be produced) are blown into the bottom of the retort $b$ through an aperture or pipe, as at $b'$, situated in any convenient part of the retort $b$, and a suitable aperture or pipe (also not shown in the drawing) is situated at the top of the tower or cupola $a$.

It will be readily understood that the mixture of chloride of calcium and clay, or other silicious or aluminous substance operated upon in the tower or cupola $a$, passing out in a decomposed state through the annex or retort $b$ and passage $e$, is traversed by the air and steam, or the air alone blown into the apparatus through the aperture or pipe in the retort $b$, and the material issuing from the said tower or cupola $a$, being heated by the products of combustion from the furnace $c$, imparts its heat into the tower or cupola in a highlyheated state, effects the decomposition of the mixture therein and the liberation of the hydrochloric acid or of the chlorine.

I claim as my invention—

In an apparatus for manufacturing hydrochloric acid or chlorine by the process of mixing chloride of calcium with silicious and aluminous substances, the combination, with the decomposing cylinder or cupola $a'$, entirely closed at its sides, of the annex or retort $b$, closed at its sides and opening at its top into the cylinder $a'$ and at its bottom into the passage $e$, the steam-pipe $b'$, arranged in the lower portion of the said retort for blowing steam upward through the retort, and a furnace arranged around the retort, substantially as shown and described.

ERNEST SOLVAY.

Witnesses:
R. S. KIRKPATRICK,
W. H. KIRKPATRICK.